(12) United States Patent
Chang et al.

(10) Patent No.: US 10,717,865 B2
(45) Date of Patent: Jul. 21, 2020

(54) POLYESTER ELASTOMER

(71) Applicant: INDUSTRIAL TECHNOLOGY RESEARCH INSTITUTE, Hsinchu (TW)

(72) Inventors: Sheng-Lung Chang, Taoyuan (TW); Jen-Chun Chiu, Pingtung (TW); Chih-Hsiang Lin, Taipei (TW); Meng-Hsin Chen, Xinpi Township (TW); Chien-Ming Chen, Taoyuan (TW); Chuh-Yung Chen, Tainan (TW); Yen-Chen Lin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 214 days.

(21) Appl. No.: 15/612,507

(22) Filed: Jun. 2, 2017

(65) Prior Publication Data

US 2017/0349744 A1 Dec. 7, 2017

Related U.S. Application Data

(60) Provisional application No. 62/345,271, filed on Jun. 3, 2016.

(30) Foreign Application Priority Data

Dec. 5, 2016 (TW) .............................. 105140064 A

(51) Int. Cl.
*C08L 67/03* (2006.01)
*C08G 63/672* (2006.01)
(Continued)

(52) U.S. Cl.
CPC ............ *C08L 67/03* (2013.01); *C08G 63/672* (2013.01); *C08G 63/6858* (2013.01);
(Continued)

(58) Field of Classification Search
CPC ...... C08G 63/672; C08G 69/14; C08G 69/44; C08L 67/02
See application file for complete search history.

(56) References Cited

U.S. PATENT DOCUMENTS 3,944,629 A * 3/1976 Hedrick .................. C08G 69/18
528/275
4,096,126 A 6/1978 Tanaka et al.
(Continued)

FOREIGN PATENT DOCUMENTS

CN 1065665 A 10/1992
CN 1099049 A 2/1995
(Continued)

OTHER PUBLICATIONS

Kiyotsukuri et al., "Poly(ethylene terephthalate) copolymers with a smaller amount of poly(ethylene glycol)s and poly(butylene glycol)s", Polymer, 1995, vol. 36, No. 13, pp. 2629-2635.
(Continued)

Primary Examiner — Gregory Listvoyb
(74) Attorney, Agent, or Firm — Birch, Stewart, Kolasch & Birch, LLP

(57) ABSTRACT

A polyester elastomer is provided, which includes a product of reacting (a) amide oligomer, (b) polyalkylene glycol, and (c) poly(alkylene arylate). (a) Amide oligomer has a chemical structure of

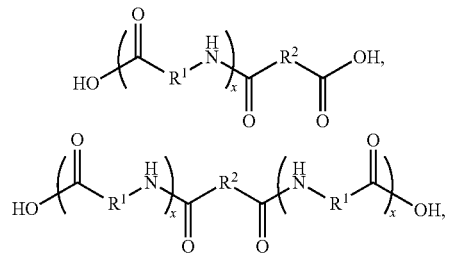

or a combination thereof, wherein $R^1$ is $C_{4-8}$ alkylene group, $R^2$ is $C_{4-8}$ alkylene group, and each of x is independently an integer of 10 to 20. (b) Polyalkylene glycol has a chemical structure of

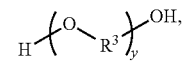

wherein $R^3$ is $C_{2-10}$ alkylene group, and y is an integer of 20 to 30. (c) Poly(alkylene arylate) has a chemical structure of

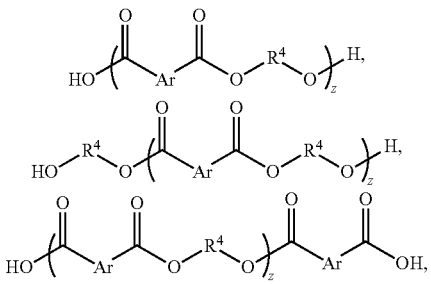

or a combination thereof, wherein Ar is

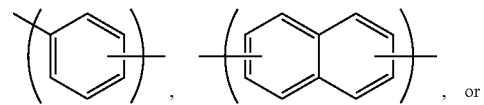

(Continued)

-continued

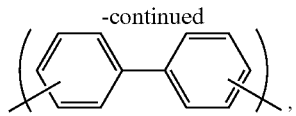

$R^4$ is $C_{2-6}$ alkylene group, and z is an integer of 1 to 10.

5 Claims, No Drawings

(51) Int. Cl.
    C08G 63/685    (2006.01)
    C08G 69/44     (2006.01)
    C08L 67/02     (2006.01)
    C08L 77/12     (2006.01)
    C08G 69/14     (2006.01)
(52) U.S. Cl.
    CPC ............ C08G 69/44 (2013.01); C08L 67/025 (2013.01); C08L 77/12 (2013.01); C08G 69/14 (2013.01); C08L 2205/05 (2013.01); C08L 2207/04 (2013.01); C08L 2308/00 (2013.01)

(56) References Cited

U.S. PATENT DOCUMENTS

| 4,195,015 | A |   | 3/1980  | Deleens et al. |
|-----------|---|---|---------|----------------|
| 4,230,838 | A |   | 10/1980 | Foy et al.     |
| 4,331,786 | A |   | 5/1982  | Foy et al.     |
| 4,349,661 | A | * | 9/1982  | Mumcu ................. C08G 69/44 |
|           |   |   |         | 525/296        |
| 5,162,455 | A |   | 11/1992 | Greene         |
| 5,853,878 | A |   | 12/1998 | Ishiwata et al. |
| 5,914,386 | A |   | 6/1999  | Berendse et al. |
| 2003/0183810 | A1 | | 10/2003 | Fujihana et al. |
| 2006/0208232 | A1 | | 9/2006  | Fujihana et al. |
| 2015/0284508 | A1 | | 10/2015 | Ou et al.      |

FOREIGN PATENT DOCUMENTS

| CN | 1480570 A    | 3/2004  |
| CN | 101100769 A  | 1/2008  |
| CN | 101851865 A  | 10/2010 |
| CN | 105585701 A  | 5/2016  |
| TW | 201617402 A  | 5/2016  |

OTHER PUBLICATIONS

Lips et al., "Incorporation of different crystallizable amide blocks in segmented poly(ester amide)s", Elsevier, Polymer, 2005, vol. 46, pp. 7834-7842.
Manuel et al., "Segmented block copolymers based on poly(butylene terephathalate) and telechelic polyesters and polyamides of dimerized fatty acids", Polymer, 1993, vol. 34, No. 20, oo, 4325-4329.
Rabani et al., Synthesis and properties of segmented copolymers containing short aramid hard segments and aliphatic polyester or polycarbonate soft segments, Elsevier, Polymer, 2005, vol. 46, pp. 27-35.
Rostaniec, "Characteristics of multiblock terpoly (ester-ether-siloxane) elastomers", Polymer, 1992, vol. 33, No. 8, pp. 1717-1723.
Taiwan Office Action for corresponding Application No. 105140064, dated Feb. 9, 2017.
Chinese Office Action dated Jul. 1, 2019 for corresponding Chinese Application No. 201710252707.5.

* cited by examiner

POLYESTER ELASTOMER

CROSS REFERENCE TO RELATED APPLICATIONS

This application claims the benefit of U.S. Provisional Application No. 62/345,271 filed on Jun. 3, 2016, and Taiwan application No. 105140064 filed on Dec. 5, 2016, the entirety of which is incorporated by reference herein.

TECHNICAL FIELD

The technical field relates to polyester elastomer, and in particular it relates to reactants thereof.

BACKGROUND

Thermoplastic polyester elastomers (TPEE) are important polymer engineering materials due to their advantages such as high thermal resistance, excellent repeated fatigue properties, high toughness, and high flexibility at low temperatures. In addition, the TPEE have heavy weight-loading abilities, a high elastic recoverability, and excellent oil/chemical/solvent resistance. The TPEE can be processed to mold using standard thermoplastic processing equipment and skills, such as extrusion, injection, blowing, and the like. The TPEE free of sulfurization can be directly used to produce rubber products, thereby increasing the production efficiency. The scrap of the TPEE can be recycled to conserve resources, which is beneficial to environment protection. In general, it is not easy to prepare a TPEE with excellent thermal resistance and an elastic recoverability, such that the development of its related materials is important.

SUMMARY

One embodiment of the disclosure provides a polyester elastomer, including: a product of reacting (a) amide oligomer, (b) polyalkylene glycol, and (c) poly(alkylene arylate), wherein (a) amide oligomer has a chemical structure of

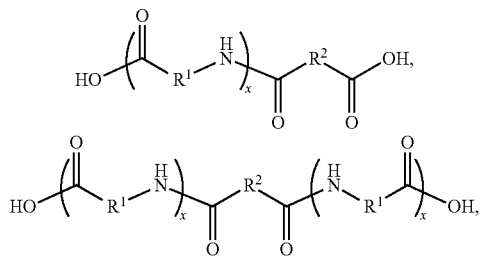

or a combination thereof, wherein $R^1$ is $C_{4-8}$ alkylene group, $R^2$ is $C_{4-8}$ alkylene group, and each of x is independently an integer of 10 to 20, wherein (b) polyalkylene glycol has a chemical structure of

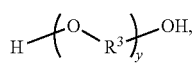

wherein $R^3$ is $C_{2-10}$ alkylene group, and y is an integer of 20 to 30, wherein (c) poly(alkylene arylate) has a chemical structure of

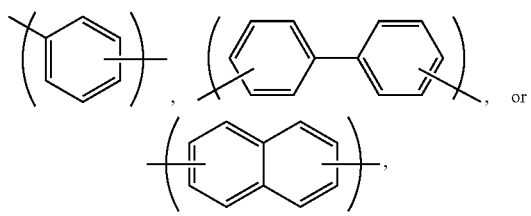

or a combination thereof, wherein Ar is

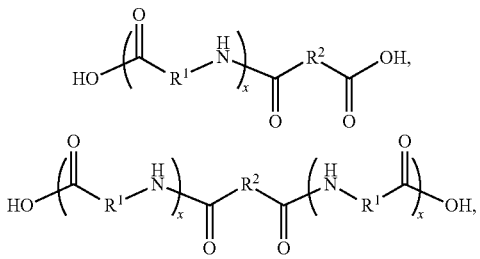

$R^4$ is $C_{2-6}$ alkylene group, and z is an integer of 1 to 10.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a polyester elastomer, including: a product of reacting (a) amide oligomer, (b) polyalkylene glycol, and (c) poly(alkylene arylate). (a) Amide oligomer has a chemical structure of or a combination thereof, wherein $R^1$ is $C_{4-8}$ alkylene group, $R^2$ is $C_{4-8}$ alkylene group, and each of x is independently an integer of 10 to 20. Too much x results in a poor reactivity of the polymerization and a low degree of polymerization. Too little x cannot efficiently enhance the properties (such as elastic recoverability) of the polyester elastomer. In one embodiment, the amide oligomer is formed by reacting lactam, water, and diacid. The lactam has a chemical structure of and the diacid has a chemical structure of

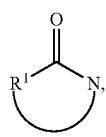

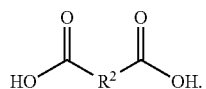

In one embodiment, the lactam and the diacid have a molar ratio of about 1:0.05 to 1:0.25. Too much diacid may result in an amide oligomer with an overly low weight average molecular weight. Too little diacid may result in an amide oligomer with an overly high weight average molecular weight, which cannot be easily polymerized in a subsequent process. The ring-opening polymerization is performed at a temperature of about 220° C. to 240° C. for about 3 hours to 5 hours. If the temperature of the ring-opening polymerization is too high or the polymerization period of the ring-opening polymerization is too long, the amide oligomer may become yellow easily. If the polymerization temperature is too low or the polymerization period is too short, the amide oligomer may have an overly low weight average molecular weight. In one embodiment, the amide oligomer has an acid value of 0.9 meq/g to 2.5 meq/g, and a weight average molecular weight of about 500 to 6000. In one embodiment, the lactam is caprolactam, and the diacid is adipic acid.

(b) Polyalkylene glycol has a chemical structure of

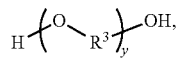

wherein $R^3$ is $C_{2-10}$ alkylene group, and y is an integer of 20 to 30. In one embodiment, the polyalkylene glycol has a weight average molecular weight of about 200 to 5000. In one embodiment, the polyalkylene glycol is poly(tetramethylene ether) glycol (PTMEG).

(c) Poly(alkylene arylate) has a chemical structure of

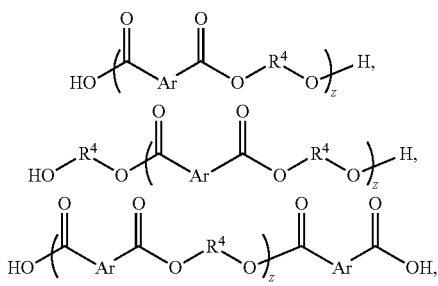

or a combination thereof. Ar is

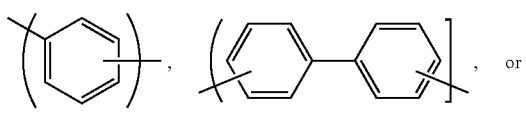

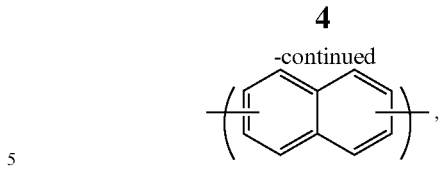

$R^4$ is $C_{2-6}$ alkylene group, and z is an integer of 1 to 10. Too much z results in a poor reactivity of the polymerization and a low degree of polymerization. If z is too small, the crystallinity and thermal resistance of the polyester elastomer may be lower. In one embodiment, the poly(alkylene arylate) has a weight average molecular weight of about 500 to 5000. In one embodiment, the poly(alkylene arylate) can be polybishydroxyethyl terephthalate(PBHET).

In one embodiment, (b) polyalkylene glycol and (c) poly(alkylene arylate) have a weight ratio of 20:80 to 80:20. Too much (b) polyalkylene glycol results in a difficult polymerization, thereby obtaining a polyester elastomer with insufficient thermal resistance. If (b) polyalkylene glycol is not enough, the elastic properties and elongation ratio of the polyester elastomer may be lower. In one embodiment, the total weight of (b) polyalkylene glycol and (c) poly(alkylene arylate) and the weight of (a) amide oligomer have a weight ratio of 99.99:0.01 to 50:50. If (a) amide oligomer is too much, the elastic recoverability and the elongation ratio of the polyester elastomer may be lower. If (a) amide oligomer is not enough, the elastic recoverability of the polyester elastomer may be insufficient.

The reaction of (a) amide oligomer, (b) polyalkylene glycol, and (c) poly(alkylene arylate) is a polymerization condensation. For example, the carboxylic acid groups at two terminals of (a) amide oligomer and the alcohol groups at two terminals of (b) polyalkylene glycol can be esterified. The carboxylic acid groups at two terminals of (a) amide oligomer and alcohol group(s) at one terminal (or at two terminals) of (c) poly(alkylene arylate) can be esterified. The alcohol groups at two terminals of (b) polyalkylene glycol and the carboxylic acid group(s) at one terminal (or at two terminals) of (c) poly(alkylene arylate) can be esterified. In addition, the —O—$R^4$—OH group at the terminal of (c) poly(alkylene arylate) can be substituted with (b) polyalkylene glycol, which is a so-called transesterification reaction. In one embodiment, the reaction of the mixture of (a) amide oligomer, (b) polyalkylene glycol, and (c) poly(alkylene arylate) is performed at a temperature of about 230° C. to 250° C. under a pressure of about 0.5 Torr to 2.0 Torr for a period of 3 hours to 6 hours. If the reaction temperature is too low, the reaction pressure is too high, or the reaction period is too short, the thermal and mechanical properties of the polyester elastomer may be poor due to its overly low molecular weight. If the reaction temperature is too high, the reaction pressure is too low, or the reaction period is too long, the polyester elastomer yellows easily, is brittle, and is degraded due to its overly high molecular weight. The polyester elastomer formed by the reaction may have an inherent viscosity of about 1.0 dL/g to 1.5 dL/g at 30° C. A lower inherent viscosity of the polyester elastomer means that the polyester having a lower molecular weight, and vice versa. In one embodiment, the polyester elastomer has an elastic recoverability of about 90% to 100%. Because the polyester elastomer has a good thermal stability and a good elastic recoverability, it may serve as fiber, plate, wire, or the like. In addition, other agents such as antioxidant or colorant can be optionally added to the polyester elastomer if necessary.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

An amide oligomer was synthesized in the following steps: 73 g of adipic acid (0.50 mole), 565 g of caprolactam (5.0 mole), and about 29 g of water (serving as a ring-opening agent) were mixed, and heated to and then reacted at 245° C. to 250° C. under nitrogen for 5 hours, thereby obtaining the amide oligomer with an acid value of about 1.43 meq/g and a weight average molecular weight of about 1200. The products of the above reaction are shown below:

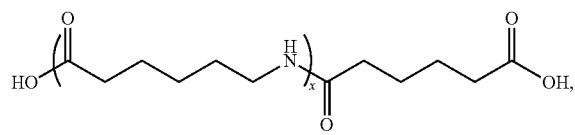

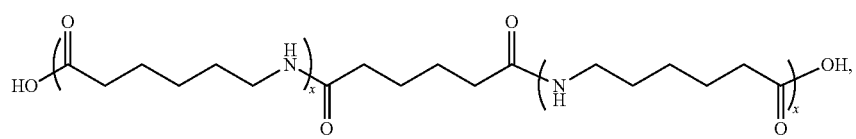

or a combination thereof.

About 1.5 g of the synthesized amide oligomer, about 298.5 g of bishydroxyethyl terephthalate (BHET, commercially available from Lealea Enterprise Co., Ltd), and about 300 g of poly(tetramethylene ether) glycol (PTMEG, commercially available from Yuan Jen Enterprise Co., Ltd) were mixed. Catalyst such as 500 ppm of tetrabutyl titanate (TBT) and 250 ppm of sodium acetate, antioxidant such as 1000 ppm of CHEMNOX-1010 (commercially available from Dun-Ho Company) and 1000 ppm of CHEMNOX-1098 (commercially available from Dun-Ho Company), and crystal promoter such as 500 ppm of Na-32 (commercially available from Dun-Ho Company) were added to the mixture. The mixture was heated to 240° C. and then vacuumed to perform a polymerization condensation for 6 hours, in which the stirring torque of the reaction was over 180 Nm. The vacuum was broken by nitrogen, and the product was poured into water to be cooled and pelletized as the polyester elastomer. Thereafter, the polyester elastomer was dried and stored.

The PTMEG has a chemical structure of

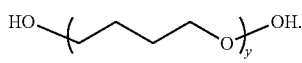

The BHET has a chemical structure of

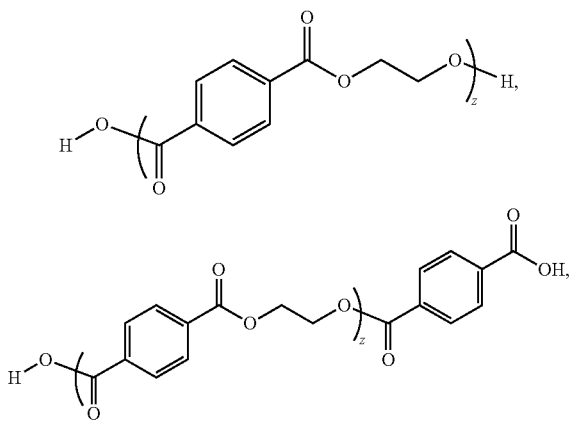

-continued

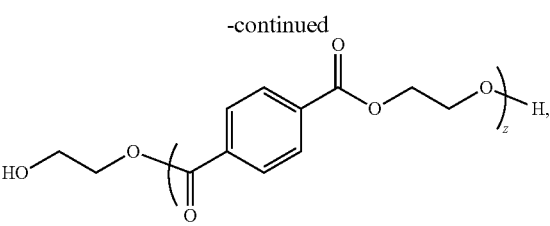

or a combination thereof.

The polyester elastomer was analyzed using a differential scanning calorimeter (DSC), an Ostwald viscometer, a universal tensile testing machine, and Shore durometer to measure its properties as indicated below: Tm was 202° C., Tcc was 149° C., inherent viscosity (IV, 30° C.) was 1.35 dL/g, tensile coefficient was 164 kgf/cm$^2$, elongation ratio was 412%, Shore hardness was 42 D, and thermal degradation temperature (Td at 5 wt % loss) was 298° C.

Example 2

Example 2 was similar to Example 1, with the differences in Example 2 being that the amide oligomer amount was changed to 15 g and the BHET amount was changed to 285 g. In Example 2, the PTMEG amount (300 g), the catalyst type and amount, the antioxidant type and amount, the crystal promoter type and amount, and the reaction conditions (e.g. temperature and period) of the polymerization condensation were similar to those in Example 1. The polyester elastomer was analyzed by DSC, Ostwald viscometer, universal tensile testing machine, and Shore durometer to measure its properties as indicated below: Tm was 184° C., Tcc was 125° C., inherent viscosity (IV, 30° C.) was 1.44 dL/g, tensile coefficient was 187 kgf/cm², elongation ratio was 609%, Shore hardness was 39 D, and thermal degradation temperature (Td at 5 wt % loss) was 349° C.

Example 3

Example 3 was similar to Example 1, with the differences in Example 3 being that the amide oligomer amount was changed to 30 g and the BHET amount was changed to 270 g. In Example 3, the PTMEG amount (300 g), the catalyst type and amount, the antioxidant type and amount, the crystal promoter type and amount, and the reaction conditions (e.g. temperature and period) of the polymerization condensation were similar to those in Example 1. The polyester elastomer was analyzed by DSC, Ostwald viscometer, universal tensile testing machine, and Shore durometer to measure its properties as indicated below: Tm was 177° C., Tcc was 104° C., inherent viscosity (IV, 30° C.) was 1.38 dL/g, tensile coefficient was 168 kgf/cm², elongation ratio was 739%, Shore hardness was 34 D, and thermal degradation temperature (Td at 5 wt % loss) was 360° C.

Example 4

Example 4 was similar to Example 1, with the differences in Example 4 being that the amide oligomer amount was changed to 45 g and the BHET amount was changed to 255 g. In Example 4, the PTMEG amount (300 g), the catalyst type and amount, the antioxidant type and amount, the crystal promoter type and amount, and the reaction conditions (e.g. temperature and period) of the polymerization condensation were similar to those in Example 1. The polyester elastomer was analyzed by DSC, Ostwald viscometer, universal tensile testing machine, and Shore durometer to measure its properties as indicated below: Tm was 169° C., Tcc was 93° C., inherent viscosity (IV, 30° C.) was 1.49 dL/g, tensile coefficient was 141 kgf/cm², elongation ratio was 687%, Shore hardness was 33 D, and thermal degradation temperature (Td at 5 wt % loss) was 351° C.

Example 5

Example 5 was similar to Example 1, with the differences in Example 5 being that the amide oligomer amount was changed to 60 g and the BHET amount was changed to 240 g. In Example 5, the PTMEG amount (300 g), the catalyst type and amount, the antioxidant type and amount, the crystal promoter type and amount, and the reaction conditions (e.g. temperature and period) of the polymerization condensation were similar to those in Example 1. The polyester elastomer was analyzed by DSC, Ostwald viscometer, universal tensile testing machine, and Shore durometer to measure its properties as indicated below: Tm was 155° C., Tch (hot crystal temperature) was 87° C., inherent viscosity (IV, 30° C.) was 1.34 dL/g, tensile coefficient was 94 kgf/cm², elongation ratio was 529%, Shore hardness was 25 D, and thermal degradation temperature (Td at 5 wt % loss) was 359° C.

Example 6

An amide oligomer was synthesized in the following steps: 182.5 g of adipic acid (1.25 mole), 565 g of caprolactam (5.0 mole), and about 29 g of water (serving as a ring-opening agent) were mixed, and heated to and then reacted at 245° C. to 250° C. under nitrogen for 5 hours, thereby obtaining the amide oligomer with an acid value of about 2.55 meq/g and a weight average molecular weight of about 600.

About 30 g of the synthesized amide oligomer, about 270 g of BHET (commercially available from Lealea Enterprise Co., Ltd), and about 300 g of PTMEG (commercially available from Yuan Jen Enterprise Co., Ltd) were mixed. Catalyst such as 500 ppm of tetrabutyl titanate (TBT) and 250 ppm of sodium acetate, antioxidant such as 1000 ppm of CHEMNOX-1010 (commercially available from Dun-Ho Company) and 1000 ppm of CHEMNOX-1098 (commercially available from Dun-Ho Company), and crystal promoter such as 500 ppm of Na-32 (commercially available from Dun-Ho Company) were added to the mixture. The mixture was heated to 240° C. and then vacuumed to perform a polymerization condensation for 4 hours, in which the stirring torque of the reaction was over 180 Nm. The vacuum was broken by nitrogen, and the product was poured into water to be cooled and pelletized as the polyester elastomer. Thereafter, the polyester elastomer was dried and stored.

The polyester elastomer was analyzed by DSC, Ostwald viscometer, universal tensile testing machine, and Shore durometer to measure its properties as indicated below: Tm was 176° C., Tcc was 108° C., inherent viscosity (IV, 30° C.) was 1.42 dL/g, tensile coefficient was 158 kgf/cm², elongation ratio was 687%, Shore hardness was 42 D, and thermal degradation temperature (Td at 5 wt % loss) was 364° C.

Example 7

An amide oligomer was synthesized in the following steps: 36.5 g of adipic acid (0.25 mole), 565 g of caprolactam (5.0 mole), and about 29 g of water (serving as a ring-opening agent) were mixed, and heated to and then reacted at 245° C. to 250° C. under nitrogen for 5 hours, thereby obtaining the amide oligomer with an acid value of about 1.03 meq/g and a weight average molecular weight of about 2400.

About 30 g of the synthesized amide oligomer, about 270 g of BHET (commercially available from Lealea Enterprise Co., Ltd), and about 300 g of PTMEG (commercially available from Yuan Jen Enterprise Co., Ltd) were mixed. Catalyst such as 500 ppm of tetrabutyl titanate (TBT) and 250 ppm of sodium acetate, antioxidant such as 1000 ppm of CHEMNOX-1010 (commercially available from Dun-Ho Company) and 1000 ppm of CHEMNOX-1098 (commercially available from Dun-Ho Company), and crystal promoter such as 500 ppm of Na-32 (commercially available from Dun-Ho Company) were added to the mixture. The mixture was heated to 240° C. and then vacuumed to perform a polymerization condensation for 4 hours, in which the stirring torque of the reaction was over 180 Nm. The vacuum was broken by nitrogen, and the product was poured into water to be cooled and pelletized as the polyester elastomer. Thereafter, the polyester elastomer was dried and stored.

The polyester elastomer was analyzed by DSC, Ostwald viscometer, universal tensile testing machine, and Shore durometer to measure its properties as indicated below: Tm was 177° C., Tcc was 110° C., inherent viscosity (IV, 30° C.) was 1.46 dL/g, tensile coefficient was 157 kgf/cm², elongation ratio was 648%, Shore hardness was 37 D, and thermal degradation temperature (Td at 5 wt % loss) was 342° C.

Comparative Example 1 (No Amide Oligomer)

About 288 g of BHET (commercially available from Lealea Enterprise Co., Ltd) and about 288 g of PTMEG (commercially available from Yuan Jen Enterprise Co., Ltd) were mixed. Catalyst such as 350 ppm of tetrabutyl titanate (TBT) and 250 ppm of sodium acetate, antioxidant such as 1000 ppm of CHEMNOX-1010 (commercially available from Dun-Ho Company), and crystal promoter such as 500 ppm of Na-32 (commercially available from Dun-Ho Company) were added to the mixture. The mixture was heated to 250° C. and then vacuumed to perform a polymerization condensation for 5 hours, in which the stirring torque of the reaction was over 180 Nm. The vacuum was broken by nitrogen, and the product was poured into water to be cooled and pelletized as the polyester elastomer. Thereafter, the polyester elastomer was dried and stored.

The polyester elastomer was analyzed by DSC, Ostwald viscometer, universal tensile testing machine, and Shore durometer to measure its properties as indicated below: Tm was 199° C., Tcc was 151° C., inherent viscosity (IV, 30° C.) was 1.39 dL/g, tensile coefficient was 168 kgf/cm², elongation ratio was 412%, Shore hardness was 40 D, and thermal degradation temperature (Td at 5 wt % loss) was 311° C.

Comparative Example 2 (Polyimide was blended with the copolymer of the BHET and PTMEG other than being copolymerized with the BHET and the PTMEG). About 300 g of the polyester elastomer in Comparative Example 1 and about 33 g of polyimide (Utramid-B40, commercially available from BASF) were mixed, and then blended by a twin screw extruder (L/D=40, w=20) at 240° C. to obtain a blend of the polyester elastomer and the polyimide, in which the screw rotation rate was 200 rpm and the extrusion rate was 3 kg/hr.

The blend was analyzed by DSC, Ostwald viscometer, universal tensile testing machine, and Shore durometer to measure its properties as indicated below: Tm was 177° C., Tcc was 110° C., inherent viscosity (IV, 30° C.) was 1.28 dL/g, tensile coefficient was 157 kgf/cm², elongation ratio was 648%, and Shore hardness was 37 D.

The elastic recoverabilities of the products in Examples 1 to 7 and Comparative Examples 1 and 2 were measured and tabulated in Table 1.

TABLE 1

| | Amide oligomer molecular weight/ratio | Elastic recoverability (%) | | |
|---|---|---|---|---|
| | | 25% Elongation | 50% Elongation | 100% Elongation |
| Example 1 | 1200/0.25 wt % | 94 | 92 | 90 |
| Example 2 | 1200/2.5 wt % | 94 | 93 | 91 |
| Example 3 | 1200/5 wt % | 94 | 94 | 92 |
| Example 4 | 1200/7.5 wt % | 96 | 94 | 93 |

TABLE 1-continued

| | Amide oligomer molecular weight/ratio | Elastic recoverability (%) | | |
|---|---|---|---|---|
| | | 25% Elongation | 50% Elongation | 100% Elongation |
| Example 5 | 1200/10 wt % | 100 | 96 | 94 |
| Example 6 | 600/5 wt % | 94 | 94 | 92 |
| Example 7 | 2400/5 wt % | 96 | 94 | 93 |
| Comparative Example 1 | — | 94 | 92 | 89 |
| Comparative Example 2 | —/10 wt % | 87 | ≤25 | ≤25 |

The elastic recoverabilities of the product in Example 5 were further measured and tabulated in Table 2.

TABLE 2

| | Amide oligomer molecular weight/ratio | Elastic recoverability (%) | | | | | |
|---|---|---|---|---|---|---|---|
| | | 25% Elongation | Spandex-25% elongation | 50% Elongation | Spandex-50% elongation | 100% Elongation | Spandex-100% elongation |
| Example 5 | 1200/10 wt % | 100 | 100 | 96 | >99 | 94 | >97 |

Accordingly, the polyester elastomers polymerized of the amide oligomer, the BHET, and the PTMEG had higher elastic recoverabilities than that of the polyester elastomer polymerized of only the BHET and the PTMEG. On the other hand, if the amide oligomer was blended with the copolymer of the BHET and the PTMEG other than being copolymerized with the BHET and the PTMEG, the blend would have an elastic recoverability lower than that of the copolymer of the BHET and the PTMEG (not blended with the amide oligomer).

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:
1. A polyester elastomer being formed by reacting (a) amide oligomer, (b) polyalkylene glycol, and (c) poly(alkylene arylate), wherein (a) amide oligomer has a chemical structure of

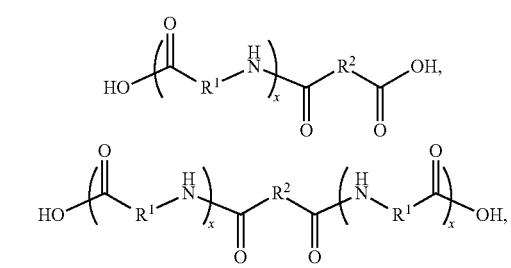

or a combination thereof,
wherein R¹ is C$_{4-8}$ alkylene group, R² is C$_{4-8}$ alkylene group, and each of x is independently an integer of 10 to 20,
wherein (b) polyalkylene glycol has a chemical structure of

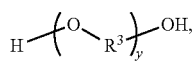

wherein $R^3$ is $C_{2-10}$ alkylene group, and y is an integer of 20 to 30, wherein (c) poly(alkylene arylate) has a chemical structure of

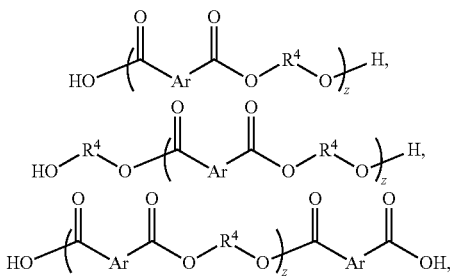

or a combination thereof, wherein Ar is

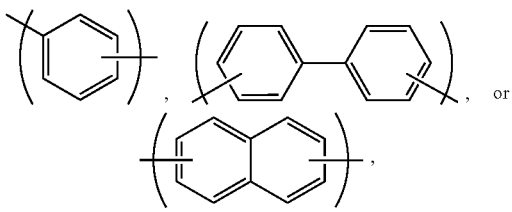

$R^4$ is $C_{2-6}$ alkylene group, and z is an integer of 1 to 10, wherein a total weight of (b) polyalkylene glycol and (c) poly(alkylene arylate) and a weight of (a) amide oligomer have a weight ratio of 99.75:0.25 to 90:10, and wherein the polyester elastomer has an elastic recoverability of about 90% to 100%.

2. The polyester elastomer as claimed in claim 1, wherein (b) polyalkylene glycol and (c) poly(alkylene arylate) have a weight ratio of 20:80 to 80:20.

3. The polyester elastomer as claimed in claim 1, having an inherent viscosity of 1.0 dL/g to 1.5 dL/g at 30° C.

4. The polyester elastomer as claimed in claim 1, wherein (a) amide oligomer is a product of reacting lactam, water, and diacid, wherein the lactam has a chemical structure of

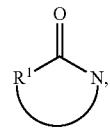

and the diacid has a chemical structure of

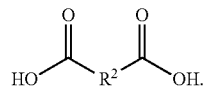

5. The polyester elastomer as claimed in claim 1, serving as fiber, plate, or wire.

* * * * *